March 18, 1969 W. W. HARDIN 3,433,933

APPARATUS FOR READING MARKS ON DOCUMENTS

Filed Dec. 7, 1965 Sheet 1 of 2

INVENTOR
WILLIAM W. HARDIN

BY Paul M. Brannen
AGENT

United States Patent Office 3,433,933
Patented Mar. 18, 1969

3,433,933
APPARATUS FOR READING MARKS ON DOCUMENTS

William W. Hardin, Stewartville, Minn., assignor to International Business Machines Corporation, Armonk, N.Y., a corporation of New York Filed Dec. 7, 1965, Ser. No. 512,082
U.S. Cl. 235—61.11 10 Claims
Int. Cl. G06k *7/00*; G01n *21/30*

This invention relates to apparatus for reading marks on documents, and particularly to an improved form of mark reading or mark sensing apparatus using a flying spot scanner. More particularly, the invention relates to mark sensing apparatus using a flying spot scanner employing a simplified arrangement for causing the scanner to scan the predetermined areas on a card or document at positions where the presence or absence of marks conveys particular information.

Mark sensing arrangements, utilizing conductive sensing or photoelectric sensing, in which a plurality of sensing elements is provided so that during the card's motion past a sensing station, the sensing devices sense the presence or absence of marks at particular positions on the card or document, are old and well known in the art. In certain circumstances, it may be preferable to sense the presence or absence of marks on a card or document by means of a flying spot scanner together with a suitable photoelectric device arranged in such fashion that the flying spot scanner sequentially scans the locations on the card at which marks may be placed to convey information, and the presence or absence of a mark is detected by noting the difference in reflectivity by means of the photoelectric sensing device.

Such arrangements in the past have been characterized by relatively complex beam control apparatus for causing the flying spot scanner to scan the character with an appropriate pattern.

Accordingly, it is an object of the present invention to provide an improved flying spot scanner for sensing marks on a document, which arrangement is characterized by relative simplicity in the circuits which govern the scanning operation of the flying spot scanner.

Another object of the invention is to provide a flying spot scanner arrangement for scanning discrete positions on documents to detect marks thereon, the arrangement having the ability to detect more than one mark in a single column even in the presence of erasures.

Still another object of the present invention is to provide a system of the type described which has the ability to detect marks versus erasures in one column followed by marks and erasures in a following column where the marks in the following column might be lighter than the erasures in the first column.

Briefly described, the present invention contemplates a flying spot scanner of the conventional type utilizing a cathode ray tube with suitable optical system to focus the light spot on a document to be read. Horizontal and vertical deflection circuits are provided which, in response to particular control signals, cause the light beam to be deflected to predetermined locations on the document. The degree of reflection of light, which varies in accordance with the presence or absence of a mark at a particular location where a beam is positioned, is detected by means of a suitable photosensitive device followed by video amplifying circuits which provide outputs indicating the presence or absence of a mark.

To control the beam positioning, a counter ring is provided having a sufficient number of outputs to encompass the number of discrete positions in any one column of a document where marks are to be detected. When the scanner beam is in the position to start scanning the document, the counter ring is set to a zero count, and thereafter as the beam moves along the document to the various predetermined locations, the voltage supplied to control the deflection of the beam is compared with a voltage generated by a digital-analog conversion system including the outputs of the rings supplied via suitable weighting impedance networks and an operational amplifier to a voltage discriminator which compares the output of the operational amplifier with the voltage provided by the beam deflection cirucit.

As each position is reached on the document, the voltage discriminator provides an output which causes the counter to advance by one position, thereby changing the count and also changing the stadardized or reference voltage against which the beam deflection voltage is compared. In this method the beam progresses in a series of accurately located steps or jumps along each column or row, as the case may be, of the document to be scanned, and the ring circuit at all times provides an indication of the position of the beam by combining the outputs therefrom. Presence or absence of video information at these locations is translated into suitable outputs by gating output circuits in accordance with the setting of the ring depending upon the presence of a signal indicating a mark at that point.

This system also includes a clipping level generator connected to receive the video signals and arranged to store a signal representing the maximum black seen on a first scan or sweep through a column, and to retain this signal to be used to control the clipping level for subsequent sweep through the mark positions, whereby it is possible to select only those signals which have a predetermined proportion to the maximum black signal seen on the first or locating scan. This method thereby insures that erasures will not be considered. Since the process is repeated for each column scanned on the document and the clipping level is set thereby, the variations in the density of the marks or erasures from column to column will not affect subsequent readings.

The foregoing and other objects, features and advantages of the invention will be apparent from the following more particular description of a preferred embodiment of the invention, as illustrated in the accompanying drawings.

In the drawings.

Similar reference characters refer to similar parts in each of the several figures of the drawings.

Figure 1:
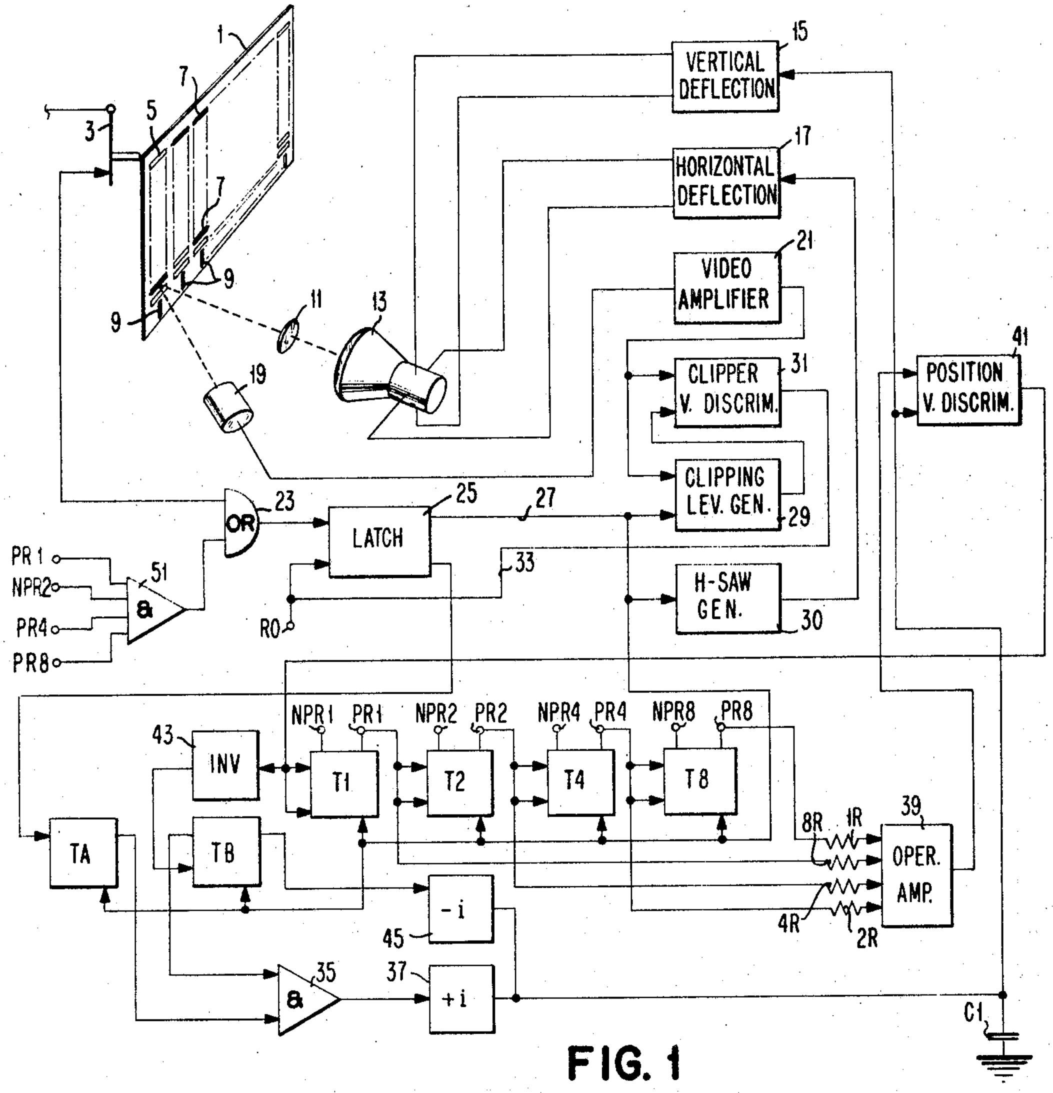
FIG. 1 is a diagrammatic view of a flying spot scanner system for mark sensing embodying the present invention.

Referring to FIG. 1, there is shown in the usual block diagram form a preferred embodiment of a mark sensing system embodying the present invention. A document 1, to be scanned for marks located in particular positions thereon, is moved to a predetermined location with respect to the flying spot scanner by document transport means not shown. A suitable switching device 3 is provided and is arranged in such manner that it closes a circuit to be later described when the card or document is in the proper position for reading. The document is illustrated as having a plurality of mark sense locations thereon, such as those indicated by the reference character 5, these locations being arranged in rows and columns. To convey information marks are placed on one or more of the mark sense locations in accordance with the information to be recorded on the document. Several of the mark sense locations are shown as having marks thereon such as the locations designated by the reference character 7. Near the lower edge of the document a plurality of locating marks 9 are provided, the purpose of which is to provide means for referencing the flying spot scanner to the particular columns on the document as will be subsequently described. The flying spot scanning system includes a suitable optical system illustrated diagrammatically by the lens 11 and a cathode ray tube 13 provided with vertical and horizontal deflection circuits 15 and 17, respectively.

The video signals, resulting from the reflection of the cathode ray tube beam from the marks on the document or the background, are picked up by a suitable photosensitive device such as the photomultiplier tube 19, after which the signals are amplified in a conventional video amplifier 21 and supplied to the circuits to be subsequently described.

It is believed that the remainder of the circuitry illustrated in connection with the preferred embodiment can be better understood if it is considered in the light of its operation as hereinafter described. When a document 1 is in proper position for reading, the contact or switch 3 will close thereby supplying an input signal to one input of a conventional OR circuit 23, the output of which is supplied to the "set" input of a latch 25 which is utilized to distinguish between a searching and a reading operation. In this case with the latch 25 set to its on condition, the mode of operation of the apparatus will be that of search. With the latch 25 set to its on condition, four trigger circuits designated by the reference characters T1, T2, T4 and T8, connected in the usual fashion to function as a four-position binary ring counter, are all reset to their off condition. This operation is accomplished by a signal provided from the search and read latch 25 on a line 27. At the same time a clipping level generator 29, the detail construction of which will be later considered, is set to a fixed clipping level for the sensing of a timing mark such as one of the marks 9 on the document 1. Also the signal on line 27 is supplied to a horizontal sawtooth generator 30 which is constructed and arranged in accordance with usual flying spot scanner or cathode ray tube techniques to move the beam from left to right along the bottom of the document. This signal on line 27 also resets two triggers, designated by the reference characters TA and TB, to their reset conditions and, as will be subsequently seen, with these triggers set in their reset condition, no vertical deflection component is applied to the deflection system of the cathode ray tube scanner. Accordingly, the scanning beam at this time will start at, for example, the left-hand edge of the document at the bottom edge thereof and move across until it encounters the first location mark 9.

When the scanning beam encounters the first location mark 9 as it moves along the bottom of the document from left to right, the change in the video signal passed through the photomultiplier tube 19 and video amplifier 21 will cause the clipper circuit 31, which has its clipping level set by clipping level generator 29, to provide an output signal. This signal on line 33 is supplied to the reset input of the latch 25 thus causing this latch to reset to the condition which may be termed read. This signal is also present at the terminal RO, but at this time since no information is to be read out, the signal at terminal RO has no effect on the readout circuits to be described later. With latch 25 reset, trigger TA will now be set to its on condition and with trigger TB in its off condition, an AND circuit 35 is enabled to thereby energize a constant current source 37 which supplies a positive charging current to the capacitor C1. This circuit is also connected to the input of the vertical deflection circuit 15 and, as a result, the beam of the cathode ray tube is caused to deflect vertically upward toward the top of a document from the timing mark 9 at an approximately linear rate. At the same time, the signal from latch 25 to the clipping level generator 29 is removed so that a storage capacitor in the clipping level generator is enabled to store the maximum negative level that occurs in the video output during the upward progression of the cathode ray tube beam. The maximum negative level will correspond to the greatest "black" signal seen as the beam progresses upward through the columnar positions. As the beam progresses upward, signals are generated in response to the marks traversed by the cathode ray tube beam and, as a result, when the beam reaches the top of the document, the storage capacitor in the clipping level generator contains a charge corresponding to the peak of the blackest or densest marks seen in the column.

Reference character 39 designates an operational amplifier of conventional type provided with a plurality of input circuits and a single output circuit, the input circuits having resistors in their circuit proportional to the values shown; that is to say, 1R, 2R, 4R and 8R. With substantially equal voltages applied to each of the input circuits, the input current will therefore be inversely proportional to the resistance in the circuit and the output of the amplifier is proportional to the sum of the input currents in accordance with conventional operational amplifiers of this type. By selecting the values of the resistors in the input circuit in the ratios indicated, the output level of amplifier 39 will correspond to the binary count contained in the counter comprising the four trigger stages T1, T2, T4 and T8. For example, with the trigger T1 set on, an input will be supplied to amplifier 39 via resistor 8R. If T1 is turned off and T2 is turned on indicating a binary count of 2, the input to the amplifier 39 is then via the resistor 4R, and since this is one-half the value of 8R, the output of the operational amplifier will be doubled as it should be. It can be seen from a consideration of the circuitry that the output of the amplifier will then be proportional to the binary count setting in the counting ring at any given time. With all of the triggers set at zero or in their reset condition, no current enters the amplifier and its output is at a zero level which is concomitant with the position of the beam at the top of the document. Each unit of current directed into the amplifier, as a result of binary counts entered into the counting ring, will cause the output level of amplifier 39 to shift by an amount corresponding to the distance between the selected positions on the document, such values, of course, being preset according to the deflection sensitivity of the cathode ray tube 13 and the associated deflection circuits 15 and 17.

During the initial traverse of the beam from the bottom to the top of the document, the vertical deflection control signal level appearing across capacitor C1, and hence supplied to the position voltage discriminator 41, will exceed the zero level voltage also supplied to the discriminator from the output of amplifier 39. Accordingly, the discriminator output supplied via an inverter 43 to the input of trigger TB will cause this trigger to be turned on. When trigger TB is turned on, the one input to the AND circuit 35 is disabled and the positive current source is accordingly turned off. At the same time the output from the on side of trigger TB enables the negative current source 45 so that the voltage across capacitor C1, and hence that which governs the vertical deflection circuits 15, will change linearly in a negative direction with the result that the scanning beam reverses its direction and starts downward toward the bottom of the document at an approximately linear rate.

At the same time the output of the position discriminator 41 is supplied to the input of the first counter trigger T1. This causes a count of 1 to be placed in the ring so that an output is present at terminal PR1 of the trigger T1 and no output is supplied at the terminal NPR1. Current is now supplied through resistor 8R to the operational amplifier 39 and causes the output of this amplifier to be shifted down one mark level; that is to say, the output of the amplifier shifts down by an amount proportional to the distance between the marks on the document. At this time the first row on the document, which in terms of the usual denotation in the so-called Hollerith code would be the "12" row, is now between the scanning beam and a point corresponding to the new level of the operational amplifier. As the scanning beam moves downward and reaches the new level, the voltage discriminator is again turned on as a result of the inputs thereto from amplifier 39 and the voltage across capacitor C1 so that an output is supplied to the counter ring and stage 1 or trigger 1 is turned off and T2 is turned on. Accordingly, the signal at terminal PR1 is removed and a signal is now provided at PR2 of stage T2, thereby providing an input through resistor 4R to amplifier 39. The amplifier output voltage now shifts to a value representative of a position below the "11" row which turns off the voltage discriminator and the scanning beam continues downward.

Each time that the scanner beam reaches the output level of the operational amplifier, the output from the voltage discriminator is supplied to the position ring causing it to advance one count and also to provide an input to the operational amplifier causing it to shift downward a further row.

Since the row position of the beam can now be directly related to the count that stands in the position ring counter, the presence of a mark in any row can be determined merely by detecting the count then standing in the position ring. Accordingly, if a mark occurs with the position ring setting with a count of 2, this particular mark has occurred in the second row from the top of the document which in Hollerith code would be an "11."

Figure 2:
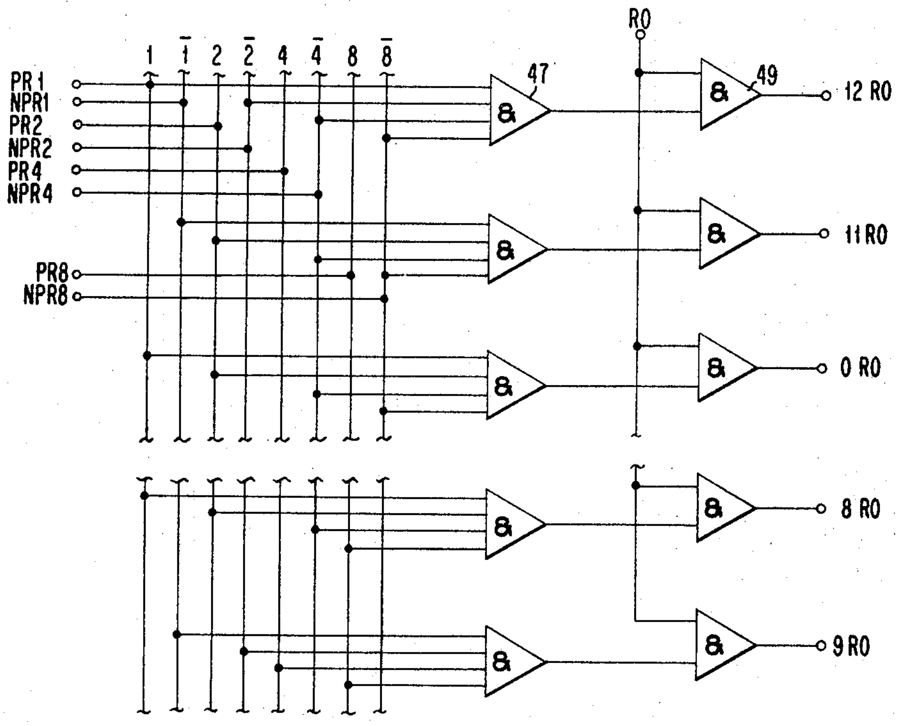
FIG. 2 is a diagrammatic view showing the output logic which provides output signals indicative of the mark sensed information.

FIG. 2 of the drawings shows one form of readout decoding circuitry which may be utilized with the present arrangement. As shown, a plurality of AND circuits are provided in pairs, one AND circuit of each pair being used to decode the binary values stored in the position ring to the decimal values associated with the usual Hollerith coding. The second AND circuit of each pair is utilized to gate the output signals in response to a readout pulse furnished from the discriminator or clipper circuit 31, the same pulse which is utilized to reset the latch 25. It is believed that the description of a single set of the readout circuits will suffice for all since they all are arranged in similar fashion. The output circuit which indicates that a mark has been sensed in the position designated as "12" by Hollerith coding utilizes an AND circuit 47 which is enabled with a count of 1 in the counter in that it requires an output from terminal PR1 of the first stage, from terminal NPR2 of the second stage, terminal NPR4 from the third stage and terminal NPR8 from the fourth stage. In other words, with only the first stage turned on and a count of 1 in the binary value position ring, AND circuit 47 will provide an output. If at this time a mark is sensed, a signal is supplied to the terminal RO and, accordingly, a second output AND circuit 49 is enabled which supplies an output to terminal 12RO, thereby indicating that a mark has been sensed in the first row on the document which corresponds to the "12" position in the Hollerith coding system. Each of the remaining readout circuits is arranged in similar fashion for all of the rows on the document, herein illustrated as the usual 12 rows provided by the Hollerith code.

As the scanning beam reaches the bottom of the document, the position ring counter will attain a count of 13 since it has passed through the 12 successive locations on the document. With a count of 13 standing in the counter, the AND circuit 51 is enabled and the output therefrom is supplied via OR circuit 23 to set latch 25 on to thereby initiate a new search mode. The beam is now at the bottom of the document and the horizontal saw tooth generator 30 is now energized to cause the beam to continue its horizontal traverse movement until it encounters a new one of the timing marks 9 at which all of the cycle described above is repeated to read the marks on the new column.

Figure 3:
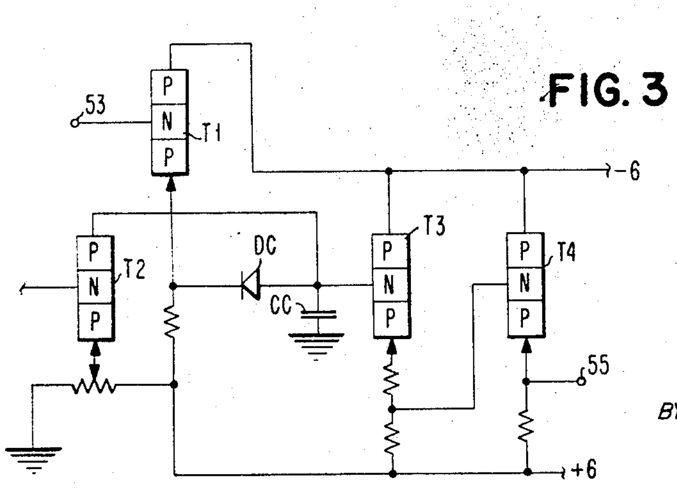
FIG. 3 is a detail drawing showing one possible arrangement for the clipping level generators shown in FIG. 1.

FIG. 3 of the drawing shows one form of clipping level generator which may be employed in the present invention. Video input signals are supplied to a terminal 53 and thence to an emitter follower circuit including the transistor TR1, having in its output a diode DC and the storage capacitor CC. A second transistor TR2 functions as a gate which either allows the capacitor CC to retain a positive charge or discharge negatively depending upon whether or not the system is in a scan or search mode. The signal appearing across capacitor CC is supplied to the two transistors TR3 and TR4 forming an output circuit which supplies an output to terminal 55, this terminal being the one which is connected to the line 33 shown in FIG. 1. Obviously, other arrangements of clipping level circuitry may be employed and the type illustrated herein is exemplary only.

Figure 4:
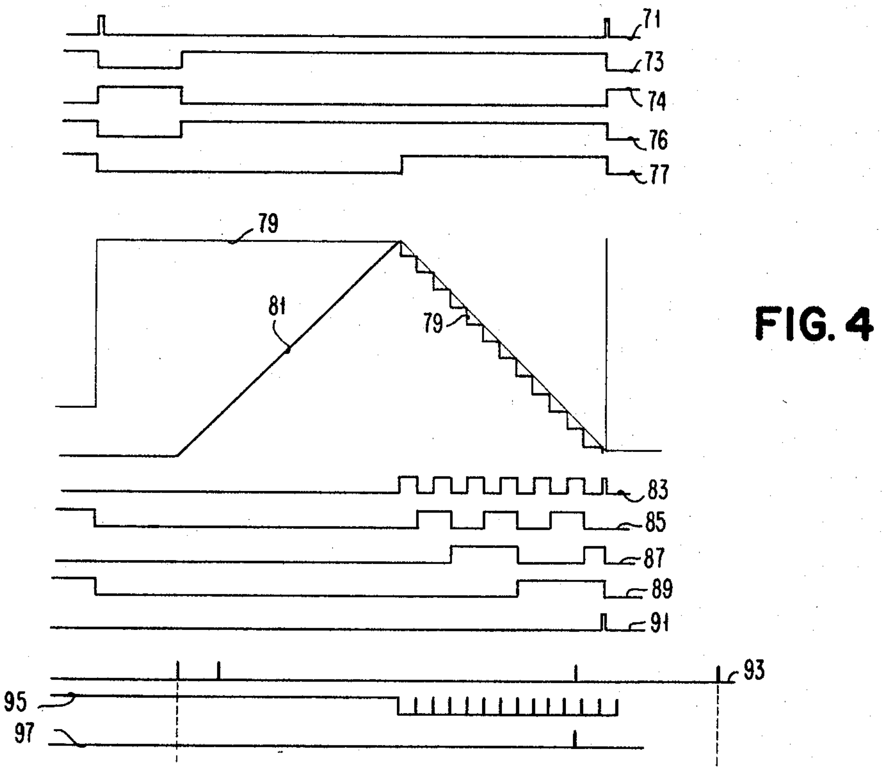
FIG. 4 is a timing chart illustrating certain of the waveforms encountered at various points in the arrangement shown in the preceding figures.

FIG. 4 is a diagrammatic illustration showing exemplary waveforms encountered at different portions of the apparatus during an operating cycle of the equipment. The waveform 71 illustrates the pulse provided at the beginning of each reading operation through the operation of the contact 3 operated by the document. Waveform 73 shows the output of latch 25 being set and then reset when the location mark is encountered. Waveform 74 shows the output of the horizontal saw tooth generator 30 which shows that the beam of the cathode ray tube scanner is moved horizontally until the first locating mark is determined at which time the horizontal saw tooth generator is deenergized to maintain the beam at that position. The waveform 76 shows the output of trigger TA turned on by the input from latch 25 and turned on again by the detection of the first location mark. Waveform 77 shows the output of the trigger TB turned off by an inverted signal from latch 25 and reset by the match of the vertical deflection voltage and the operational amplifier output. Waveform 79 shows the output of the operational amplifier 39 illustrating how it is set to a particular reference level at the start of the operation, and thereafter is decremented in a series of equal steps in response to the operation of the counting ring as explained previously. Waveform 81 shows the linear upward vertical sweep of the cathode ray tube beam in response to the deflection voltage and the corresponding linear downward sweep superimposed on the downward step by step decrementing of the output of the operational amplifier. The waveforms 83, 85, 87 and 89 represent the outputs of stages T1, T2, T4 and T8 of the counting ring and illustrate the manner in which the output pulses, indicating correspondence of the operational amplifier voltage and the vertical deflection voltage, are counted in binary form. The waveform 91 illustrates the output pulse produced for the count of 13 which restores the operation to the search condition and provides an additional start pulse 71 for the next cycle of operation. Waveform 93 shows the output of the clipper circuit 31 and indicates the video pulses resulting from the scanning of the timing marks and also of the information marks. Waveform 95 illustrates the output from the position voltage discriminator 41 which compares the output of the vertical deflection circuit with the output of the operational amplifier to provide pulses for operating the counter circuit. Waveform 97 is illustrative of the manner in which a mark sense pulse, such as the one shown to the right of the waveform 93, is passed by the output circuitry as a result of operation of the decoding circuits illustrated in FIG. 3.

While he invention has been particularly shown and described with reference to a preferred embodiment thereof, it will be understood by those skilled in the art that various changes in form and details may be made therein without departing from the spirit and scope of the invention.

What is claimed is:

1. Apparatus for reading marks on documents comprising, in combination:

a flying spot scanner for scanning each of said documents with a scanning beam moving sequentially over predetermined positions where the presence or absence of marks on the document conveys information;

first deflection circuit means for governing said flying spot scanner to successively position said scanning beam to predetermined locations along one edge of said document;

second deflection circuit means for governing said flying spot scanner to successively position said scanning beam to redetermined marking locations in a direction angularly related to said one edge of said document, said redetermined marking locations designating points at which the presence or absence of a mark signifies data;

detection means effective to provide mark sense output signals when said beam encounters a mark at one of said predetermined marking locations;

position signal generating means for generating a plurality of position signals having a predetermined relationship to the distance of said marking locations from the edge of the document;

comparator means for comparing the output of said second deflection circuit with the output of said position signal generator means;

means responsive to the output of said comparator means for governing said position signal generating means; and output means governed by said detector means and said position signal generating means for providing outputs indicative of marks sensed at said predetermined marking locations.

2. Apparatus for reading marks on documents as claimed in claim 1, in which said mark sensing locations on said document are arranged in rows and columns and said first and said second deflection circuits produce beam motion for scanning said beam in directions at right angles to each other.

3. Apparatus for reading marks on documents as claimed in claim 1, wherein said position signal generating means includes a counter having at least as many unique outputs as the number of position signals required.

4. Apparatus for reading marks on documents as claimed in claim 3, wherein said position signal generating means further includes analog means for deriving an analog voltage proportional to the digital outputs of said counter.

5. Apparatus for reading marks on documents as claimed in claim 4, wherein said analog means comprises an operational amplifier having a plurality of input circuits connected to the outputs of said counter through predetermined valves of weighting impedance.

6. Apparatus for reading marks on documents as claimed in claim 3, wherein said counter has at least one excess unique output than the number of position signals required, and means operatively connected to said counter and to said first deflection circuit means for moving said scanning beam to successive ones of said predetermined locations along one edge of said document when the counter provides said excess unique output.

7. Apparatus for reading marks on documents as claimed in claim 6, wherein said output means comprises a plurality of combinatorial logic circuits connected to said counter and said detector means, and providing an output indicative of a mark sensed at said predetermined locations in accordance with the value in said counter corresponding to said location.

8. Apparatus for reading marks on documents as claimed in claim 1, further including document sensing means operatively connected to said first deflection circuit means for initiating the scanning of said document after the document is properly positioned to establish a fixed relationship between said document and said flying spot scanner.

9. Apparatus for reading marks on documents according to claim 1, in which said second deflection circuit means provides a first scan of said predetermined marking locations for setting a clipping level, and a second scan for sensing marks which exceed the clipping level set during the first scan.

10. Apparatus for reading marks on documents according to claim 9, in which said first scan is accomplished by said second deflection circuit means controlling said scanner beam to scan said beam in a first direction away from said one edge of said document, and then to reverse the motion of the scanner beam to scan said beam in a second direction toward said one edge of said document.

References Cited

UNITED STATES PATENTS

| | | | |
|---|---|---|---|
| 2,596,741 | 5/1952 | Tyler et al. | |
| 3,074,050 | 1/1963 | Shultz ---------- | 235—61.115 |

MAYNARD R. WILBUR, *Primary Examiner.*

SOL SHEINBEIN, *Assistant Examiner.*

U.S. Cl. X.R.

250—219